J. W. Masten.

Corn Planter.

N° 28,386.  Patented May 22, 1860.

UNITED STATES PATENT OFFICE.

JOHN W. MASTEN, OF UTICA, MICHIGAN.

IMPROVEMENT IN SEED-PLANTERS.

Specification forming part of Letters Patent No. 28,386, dated May 22, 1860.

*To all whom it may concern:*

Be it known that I, JOHN W. MASTEN, of Utica, in the county of Macomb and State of Michigan, have invented a new and useful Improvement in Seed-Planters; and I do hereby declare that the following is a full, clear, and exact description of the same, reference being had to the accompanying drawings, forming a part of this specification, in which—

Figure 1:
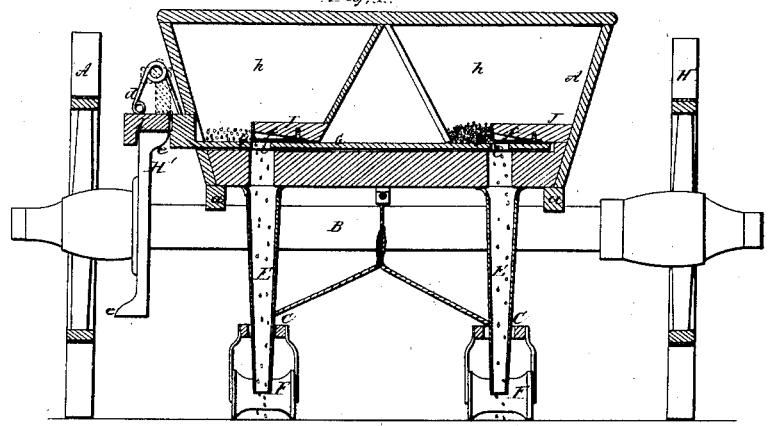
Figure 2:
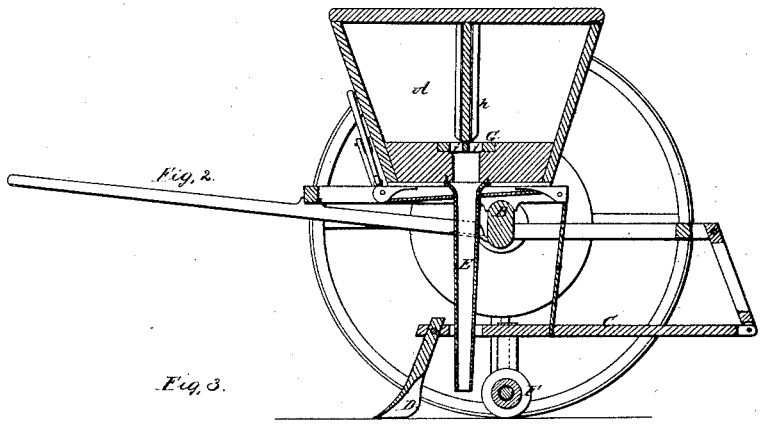
Figure 3:
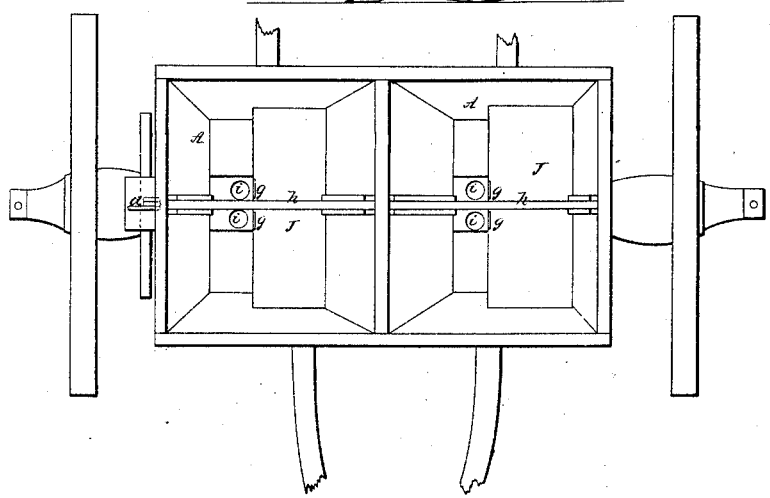

Figure 1 is a vertical longitudinal section of a seed-planter with my improvements on it. Fig. 2 is a vertical transverse section of the same, and Fig. 3 a plan or top view.

Similar letters of reference in each of the several figures indicate corresponding parts.

To enable others skilled in the art to make and use my invention, I will proceed to describe its construction and operation.

A is the seed hopper or box. It is supported on a frame, $a$, resting on axle B, said axle having driving-wheels H.

C is a jointed frame connected to the under side of the axle, and having its bottom sections hinged, as shown at $b$. To the forward end of these hinged sections are secured furrow-shares D, immediately behind which an opening or hole is made in the hinged sections to allow the seed-conducting tube E to pass through, said tube being placed directly under and in communication with an opening in the bottom of hopper A, and serving to conduct the seed into the furrow prepared by the shares D. A concave seed-roller, F, is suspended from the frame C, just behind the tube. The hinged frame is connected to a lever by cords, said lever serving to elevate said frame out of the way in passing over strong, rough, and stumpy ground, and in going to and returning from the field. A partition, $h$, is placed in the center of the hopper, and extends the whole length of the same, and (in connection with the seed-slide G, which has two seed-cells, $i\ i$, in it, one on each side of said partition, as shown in the drawings) affords facilities to sow seed and fertilizer at the same time. The seed-conducting tube E is enlarged at its top, and situated so as to encompass the two holes, so as to receive the seed and fertilizer discharged from each cell at the same time and conduct them down to the ground together.

The slide G has a hinged head or projection, I, on its end, projecting out of the hopper, as represented in the drawings. This head is drawn up when the machine is not in operation, and is allowed to hang down when the machine is in operation. A spring, $d$, is attached to the end of the main slide, and is arranged to force down the hinged head or projection and retain it in a proper position during the operation of planting. The hinged projection is constructed in such relation to the main slide as to form a groove, wherein the wheel H' revolves, said wheel having cams $e\ e$ projecting from opposite sides at or near its periphery.

J J are plates secured to the bottom of the hopper. These plates each have an inclined groove, $f$, on the under sides, said groove allowing a spring, $g$, to play up and down in it. This spring operates, in connection with the seed-cell in the slide, as a cut-off, and, in case any seed should get wedged in between the cut-off and the edge of the cell, gives upward and allows the seed to go through, thus insuring a regular and certain discharge of the grain.

K are projections placed on the wheel H of the machine in such a position that they leave their marks precisely opposite the spot where the seed are dropped. When the operator reaches the end of the row or field and drives back, the clogs hit upon their old marks, which serve as a guide for him to return by, and the seed are consequently dropped opposite the former hills, thus securing the advantage of an even row of corn both ways.

What I claim as my invention, and desire to secure by Letters Patent, is,—

1. The adjustable hinged projection I on the seed-slide G, in combination with the cams $e\ e$ on wheel H', substantially as and for the purposes set forth.

2. The arrangement of the partitioned hopper A, distributing seed-slide G, spring cut-offs $g$, adjustable hinged projection I, wheel H', with cams $e\ e$, main frame $a$, and jointed frame C, in the manner and for the purposes set forth.

JOHN W. MASTEN.

Witnesses:
E. P. ADAIR,
I. H. EMERY.